3,031,501
PREPARATION OF 2,5-DIARYLAMINO-TEREPHTHALIC ACID AND SALTS THEREOF
William S. Struve, Chatham, N.J., and Albert D. Reidinger, Wilmington, Del., assignors to E. I. du Pont de Nemours and Company, Wilmington, Del., a corporation of Delaware
No Drawing. Filed June 16, 1958, Ser. No. 742,024
12 Claims. (Cl. 260—518)

This invention relates to an improved process for the preparation of 2,5-diarylamino-terephthalic acids and the metal salts of these acids.

2,5-diarylamino-terephthalic acids are a known class of compounds which may be represented by the following formula

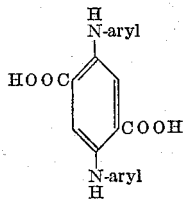

For example, Liebermann, Ann., 404, 295–308 (1914), discloses a process for preparing dianilino-terephthalic acid by first oxidizing diethyl 2,5-dianilino-3,6-dihydroterephthalate and then hydrolyzing the oxidized ester to the desired acid.

It is an object of the present invention to provide a new and improved process for the production of 2,5-diarylamino-terephthalic acids and their metal salts. Another object is to provide a process which increases the yields of these products. It is a further object to provide a more convenient process for the production of these acids and salts.

The objects of this invention are accomplished by the simultaneous oxidation and saponification of a dialkyl 2,5-diarylamino-3,6-dihydro-terephthalate. These simultaneous reactions are carried out by heating the dihydro-terephthalate to reaction temperature in a water solution of a strong alkali (or in an alcohol-water solution of the alkali) containing a mild oxidizing agent. A salt of 2,5-diarylamino-terephthalic acid is thus produced and it may be recovered from the solution, or it may be converted to the free acid by acidification.

In a preferred embodiment of this invention, diethyl 2,5-dianilino-3,6-dihydro-terephthalate is added to a solution of sodium hydroxide in a mixture of water and ethyl alcohol contained in a vessel equipped with an agitator and a reflux condenser. A solution of nitro-benzene-meta-sodium sulfonate in water is then added, and the mixture is heated to the boil and heating is continued under reflux to convert the dihydro ester to the disodium salt of 2,5-dianilino-terephthalic acid. After the reaction mixture is cooled and diluted with a relatively large volume of cold water, it is slowly acidified with a suitable amount of a strong mineral acid such as hydrochloric acid. The resulting free acid is a highly colored, water-insoluble precipitate which is readily isolated by filtration. It may then be washed free of soluble salts and dried. This embodiment is equally applicable to the preparation of other diarylamino terephthalic acids and their salts. For example, the starting diethyl 2,5-dianilino-3,6-dihydroterephthalate may be replaced by corresponding terephthalates in which the diarylamino groups are derived from the various monochloro-anilines and dichloro-anilines, the various toluidines and anisidines, as well as alpha and beta naphthylamine.

For a clearer understanding of the invention, the following specific examples are given. These examples are intended to be merely illustrative of the invention and not in limitation thereof. Unless otherwise specified, all parts are by weight.

EXAMPLE I 100 parts of diethyl 2,5-dianilino-3,6-dihydroterephthalate is added to 320 parts of ethyl alcohol in a jacketed vessel equipped with an agitator and a reflux condenser. There is then added, in turn, a solution of 75 parts of nitrobenzene-meta-sodium sulfonate in 100 parts of water and a solution of 30 parts sodium hydroxide in 120 parts of water. The mixture is then heated to the boil under good agitation and maintained at the boil under total reflux for about 30 minutes. The charge is then poured into about 2000 parts of cold water and slowly acidified with about 95 parts concentrated hydrochloric acid until there is a strong positive test on Congo red paper (pH less than about 3.0). After stirring about 15 minutes, the highly colored precipitate is isolated by filtering, washed free of soluble salts and dried at about 60° C. to give about 85 parts of a purple solid (99.2% yield).

EXAMPLE II

The following table shows the use of other diethyl 2,5-diarylamino-3,6-dihydroterephthalates in which the arylamino groups are derived from substituted anilines or naphthylamines. In all other respects, the procedure follows exactly that of Example I. In each case, the yields of the resulting free acids are given in parts and also in percent of theory.

Table I

| Starting Ester | Parts Starting Ester | Yield of Free Acid | |
|---|---|---|---|
| | | Parts | Percent of Theory |
| Diethyl 2,5-diarylamino-3,6-dihydro-terephthalate in which the arylamino groups are derived from: | | | |
| o-chloro-aniline | 100 | 86 | 97.9 |
| m-chloro-aniline | 100 | 86 | 97.6 |
| p-chloro-aniline | 100 | 87 | 99.0 |
| o-bromo-aniline | 100 | 88 | 98.0 |
| o-toluidine | 100 | 85 | 97.8 |
| p-toluidine | 100 | 86 | 99.0 |
| p-anisidine | 100 | 85 | 97.8 |
| α-naphthylamine | 100 | 86 | 97.2 |
| β-naphthylamine | 100 | 87 | 98.3 |
| o-fluoro-aniline | 100 | 85 | 98.0 |
| o-iodo-aniline | 100 | 87 | 97.0 |

EXAMPLE III 100 parts of diethyl 2,5-dianilino-3,6-dihydro-terephthalate is added to 320 parts of ethyl alcohol in a jacketed vessel equipped with an agitator and a reflux condenser. There is then added, in turn, a solution of 75 parts of nitrobenzene-meta-sodium sulfonate in 100 parts of water and a solution of 30 parts sodium hydroxide in 120 parts of water. The mixture is then heated to the boil under good agitation and maintained at the boil under total reflux for about 30 minutes. The charge is then poured into about 2000 parts of cold water, after which 600 parts of crystalline sodium chloride is added and agitation is continued for about 15 minutes. The yellow, highly crystalline disodium salt of 3,6-dianilino-terephthalic acid is isolated by filtration. It is then washed with a saturated solution of sodium chloride and dried at about 60° C. This salt can be readily converted to the free acid by dissolving in water and acidifying. Recovery of the acid can be accomplished by filtration.

The dialkyl 2,5-diarylamino-3,6-dihydro-terephthalate products used as the starting materials in this invention may be readily prepared by the method disclosed in U.S. Patent 2,821,541 wherein a dialkyl succinate is condensed with itself under the influence of a sodium alkoxide to produce the corresponding dialkyl succinyl-succinate. This latter compound is then condensed with an appropriate arylamino compound, such as aniline, o-chloro-aniline, p-chloro-aniline, the various toluidines, the various anisidines and the like. This is a convenient method for the preparation of the starting ester, but it should be understood that the present invention is not restricted to any specific method of preparing the various starting materials.

The choice of alkyl derivative in both the succinate and the sodium alkoxide is largely dictated by availability of raw materials. It is desirable, but not a prerequisite, that the same alkyl group be found in both and the combination of diethyl succinate and sodium ethoxide in the initial reaction is preferred because of their ready availability. However, the methyl and propyl derivatives may be used with equal success. Likewise, sodium methoxide, a readily available dry powder, may be used in combination with dimethyl, diethyl, or dipropyl succinate. In such cases, each of the alkyl groups in the terephthalate ester, which is the starting material for the process of this invention, may be any of the lower alkyl groups and they are not necessarily the same.

The hydrolysis of an organic ester to its component acid and alcohol is a well-known reversible reaction. However, when this reaction proceeds under the influence of a fairly strong aqueous alkali, the acid is immediately converted to its alkali metal salt and the reaction is driven to completion. Such an hydrolysis under the influence of alkali is often called saponification, and this term has been used herein. In general, this reaction requires an elevated temperature and considerable time for completion. It is common to carry it out at the boil and to continue the heating until the material is all in solution, indicating the disappearance of the water-insoluble ester. If solubility is promoted by the addition of an alcohol, the time may be shortened. Obviously, lower temperatures will increase the time required while operating under pressure at higher temperatures will decrease it. The process of this invention, in which there is simultaenous saponification and oxidation of the starting dihydro esters, follows the conventional reaction except for the essential difference that the saponifying solution requires, in addition to the alkali, the presence of an oxidizing agent. If such saponification is carried out in the conventional manner without the oxidizing agent, decomposition and low yields result. Although the conditions may vary widely as desired under the circumstances, it is convenient to carry it out at the boil under reflux for about 30 minutes to one hour.

The solution may be a solution of any convenient alkali in water or in a mixture of water and a water-soluble alcohol, such as methanol, ethanol or the propyl alcohols. The relative proportions of water and alcohol are not critical. The preferred alkalis are the alkali metal hydroxides; e.g. sodium hydroxide, potassium hydroxide, and lithium hydroxide. In view of the fact that the saponification of an organic ester is a well-known procedure in which a large number of saponifying agents have been used, it will be apparent to one skilled in the art that there are other possible choices of alkalis, such as the alkaline earth metal hydroxides of which calcium hydroxide and barium hydroxide are members. These latter materials, however, are known to form water-insoluble salts, and in some cases this may be undesirable. The amount of alkali should be sufficient to supply a metal ion to each of the two carboxy groups in the ester portions of the starting dihydro-terephthalate; i.e., there should be at least 2 mols of alkali per mol of starting ester. A slight excess, on the order of 5–10%, is usually used. The concentration of the alkali in this solution is relatively unimportant, but it is common to use a concentration on the order of 5% based on the total liquid present.

In choosing a suitable mild oxidizing agent, the preferred material is nitrobenzene-meta-sodium sulfonate. It is usually added as a fairly strong solution in water (on the order of 40%). The amount used should be enough to bring about the oxidation and is commonly about 0.75 part per part of the ester to be oxidized. This agent is equally effective in water alone or in mixtures of water with water-soluble alcohols. It is possible to bring about this reaction by using air oxidation in place of the chemical oxidation, but such a process is much less efficient and difficult to control.

The isolation of the final free acid from the reaction mixture is entirely conventional in that the solution is acidified with an acid, such as hydrochloric acid, acetic acid, sulfuric acid, phosphoric acid or the like. The free diarylamino-terephthalic acids resulting from this acidification are substantially insoluble in either water or water-alcohol mixtures; therefore, they are easily recovered by conventional procedures.

This invention provides a very much simplified procedure for the preparation of diarylamino-terephthalic acids. In addition to this, the present invention makes it possible to obtain yields which show marked improvement over those of any prior art process.

Since it is obvious that many changes and modifications may be made in the above-described details without departing from the nature and spirit of the invention, it is to be understood that the invention is not to be limited to said details except as set forth in the appended claims.

We claim:
1. A process for the preparation of a 2,5-diarylamino-terephthalic acid comprising simultaneously saponifying and oxidizing a lower dialkyl 2,5-diarylamino-3,6-dihydro-terephthalate by heating said terephthalate in an aqueous solution of an alkali metal hydroxide containing a mild oxidizing agent selected from the group consisting of air and nitrobenzene-meta-sodium sulfonate, and acidifying the reaction mixture to produce 2,5-diarylamino-terephthalic acid.

2. The process of claim 1 in which the oxidizing agent is nitrobenzene-meta-sodium sulfonate.

3. A process for the preparation of an alkali metal salt of a 2,5-diarylamino-terephthalic acid comprising simultaneously saponifying and oxidizing a lower dialkyl 2,5-diarylamino-3,6-dihydro-terephthalate by heating said terephthalate in an aqueous solution of an alkali metal hydroxide containing a mild oxidizing agent selected from the group consisting of air and nitrobenzene-meta-sodium sulfonate.

4. A process for the preparation of an alkali metal salt of a 2,5-diarylamino-terephthalic acid comprising simultaneously saponifying and oxidizing a lower dialkyl 2,5-diarylamino-3,6-dihydro-terephthalate by heating said terephthalate in an aqueous solution of an alkali metal hydroxide containing nitro-benzene-meta-sodium sulfonate.

5. A process for the preparation of a 2,5-diarylamino-terephthalic acid which comprises simultaneously saponifying and oxidizing a lower dialkyl 2,5-diarylamino-3,6-dihydro-terephthalate by refluxing an aqueous solution of an alkali metal hydroxide containing said terephthalate and a mild oxidizing agent selected from the group consisting of air and nitrobenzene-meta-sodium sulfonate, and then acidifying the reaction product.

6. A process for the preparation of an alkali metal salt of 2,5-diarylamino-terephthalic acid which comprises simultaneously saponifying and oxidizing a lower dialkyl 2,5-diarylamino-3,6-dihydro-terephthalate by refluxing an aqueous solution of an alkali metal hydroxide containing said terephthalate and a mild oxidizing agent selected from the group consisting of air and nitrobenzene-meta-sodium sulfonate.

7. A process for the preparation of a 2,5-diarylamino-terephthalic acid comprising simultaneously saponifying and oxidizing a diethyl-2,5-diarylamino-3,6-dihydro-terephthalate by heating said terephthalate in an aqueous solution of an alkali metal hydroxide containing nitrobenzene-meta-sodium sulfonate, and acidifying the reaction mixture to produce 2,5-diarylamino-terephthalic acid.

8. The process of claim 7 in which the reaction is carried out in a solution of sodium hydroxide in an alcohol-water mixture.

9. The process of claim 8 in which the diethyl-2,5-diarylamino-3,6-dihydro-terephthalate is diethyl-2,5-dianilino-terephthalate.

10. The process of claim 3 in which the oxidizing agent is nitrobenzene-meta-sodium sulfonate.

11. The process of claim 5 in which the oxidizing agent is nitrobenzene-meta-sodium sulfonate.

12. The process of claim 6 in which the oxidizing agent is nitrobenzene-meta-sodium sulfonate.

References Cited in the file of this patent

Liebermann: Chem. Absts., vol. 8, pp. 2150–1 (1914).
Liebermann: "Ann.," 404, pp. 300–408 (1914).
Tachi et al.: Chem. Absts., vol. 49, col. 15233 (1955).